United States Patent
Ofir et al.

(10) Patent No.: US 9,961,663 B2
(45) Date of Patent: *May 1, 2018

(54) METHOD AND APPARATUS FOR MOVING NETWORK EQUIPMENT WITHIN A COMMUNICATION SYSTEM

(71) Applicant: MOTOROLA SOLUTIONS, INC, Schaumburg, IL (US)

(72) Inventors: Gabi Ofir, Reshon Letzion (IL); Eitan Koren, Ra'anana (IL); Itzhak Shperling, Bnei-Brak (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 134 days.

This patent is subject to a terminal disclaimer.

(21) Appl. No.: 14/869,112

(22) Filed: Sep. 29, 2015

(65) Prior Publication Data

US 2017/0094633 A1 Mar. 30, 2017

(51) Int. Cl.
*H04L 12/26* (2006.01)
*H04W 64/00* (2009.01)
*H04W 24/02* (2009.01)
*H04W 28/02* (2009.01)

(52) U.S. Cl.
CPC ......... *H04W 64/003* (2013.01); *H04W 24/02* (2013.01); *H04W 28/0215* (2013.01)

(58) Field of Classification Search
CPC ... H04W 16/18; H04W 64/003; H04W 24/02; H04W 64/00
See application file for complete search history.

(56) References Cited

U.S. PATENT DOCUMENTS

| 6,349,217 | B1 * | 2/2002 | Honcharenko | H04W 16/28 455/452.1 |
| 9,042,917 | B2 | 5/2015 | Edge | |
| 2006/0223546 | A1 * | 10/2006 | Claussen | H04W 16/18 455/456.1 |
| 2007/0121560 | A1 * | 5/2007 | Edge | H04W 64/00 370/338 |
| 2014/0357283 | A1 | 12/2014 | Almoghathawi et al. | |
| 2014/0357284 | A1 | 12/2014 | Almoghathawi et al. | |

FOREIGN PATENT DOCUMENTS

EP 1 482 749 B1 7/2007
WO 2015/021159 A1 2/2015

OTHER PUBLICATIONS

Akkaya K., et al., "Positioning of Base Stations in Wireless Sensor Networks," IEEE Communications Magazine, vol. 15, Issue 4, Apr. 16, 2007, pp. 96-102.
Zadeh P.D.H., et al., "Distributed optimal dynamic base station positioning in wireless sensor networks," Computer Networks, vol. 56, Issue 1, Jan. 12, 2012, pp. 34-49.

* cited by examiner

*Primary Examiner* — Afshawn M Towfighi

(57) ABSTRACT

A method and apparatus for moving network equipment is provided herein. During operation, an optimal base station configuration will be determined. Currently-employed network equipment will be moved based on a determination if adequate coverage will be provided to users of the system.

12 Claims, 7 Drawing Sheets

METHOD AND APPARATUS FOR MOVING NETWORK EQUIPMENT WITHIN A COMMUNICATION SYSTEM

FIELD OF THE INVENTION

The present invention generally relates to moving network equipment, and in particular to moving network equipment based on a Quality of Service (QoS) of running applications.

BACKGROUND OF THE INVENTION

Oftentimes a public-safety incident will over tax any communications network equipment handling an incident. For example, due to a large number of public-safety devices and personnel at, for example, a large fire, a base station(s) handling wireless communications may be overloaded. In order to solve this issue, it has been proposed to provide mobile base stations at the incident scene in order to aide communications. For example, WO2015/021159 A1, entitled SYSTEM AND METHOD FOR IMPLEMENTING AN AIRBORNE TELECOMMUNICATION NETWORK USING AN UNMANNED AERIAL VEHICLE, (incorporated by reference herein), provides for a drone to aide in restoring telecommunications in areas otherwise isolated by a disaster.

The deployment of mobile base stations will undoubtedly aide a current base site with capacity issues, however, the operator of the communication system will have the added expense of investing additional base stations, as drones, that are used very seldom. It would be more beneficial if the currently employed base stations can reconfigure themselves to aide in optimizing the communication system.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
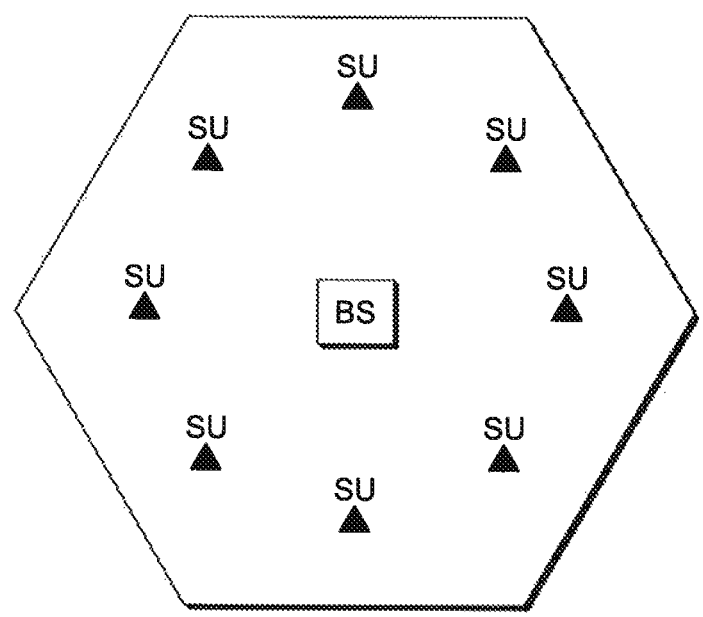
FIG. 1 illustrates a center-of-gravity approach to locating network equipment.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to improve radio-frequency (RF) coverage, a method and apparatus for moving network equipment is provided herein. During operation, an optimal base station configuration will be determined. Currently-employed network equipment will be moved based on a determination if adequate coverage will be provided to users of the system.

It should be noted that in a first embodiment of the present invention, network equipment comprises a base transceiver station (BTS) connected wirelessly to existing communication system infrastructure. A BTS is generally considered an "intelligent" terminal, as it has the processing and control capability to influence a substantial amount of the communication traffic passing through it. In a further embodiment of the present invention, network equipment comprises a radio repeater station, which performs a minimal amount of processing in receiving a communication and re-transmitting the received communication along the wireless communication path. As a repeater station has little control over the communication passing through it, it is often termed a "dummy" terminal. For ease of understanding, the following description is provided describing a base station being deployed; however, one of ordinary skill in the art will recognize that any network equipment may be deployed as described herein without varying from the scope of the invention.

Network equipment will be moved when needed, via a mobile platform, such as, but not limited to, a cell on wheels (COW), a snowmobile, a drone, an aircraft, a balloon, or any other means for deploying network equipment to provide coverage to a determined route.

In one embodiment of the present invention, a determination of whether or not adequate coverage exists is determined by determining a required QoS for a plurality of applications (services) running on devices, and moving a currently-functioning base station to a location that best accommodates the required QoS for the plurality of applications/services. This approach of moving a base station based on the QoS needs of devices is referred to as a quality-of-service approach to locating a base station.

In another embodiment of the present invention, a determination of whether or not adequate coverage exists is determined by determining a center of mass for a plurality of applications (services) running on devices, and moving a currently-functioning base station to a location to the center of mass location. This approach of moving a base station based on the center of mass of devices is referred to as a center-of-mass approach to locating a base station.

As described above, the cellular Base Station (base station) physical location is made variable. It frequently changes (i.e., hourly) to a nearest physically feasible point to an optimal location that achieves optimal system performance, based on one of two approaches. Whether or not a base station is moved depends on the distribution of devices and if their QoS requirements are being satisfied. This can happen frequently, and can be a configurable parameter.

The base station location can be changing all the time to match the changing distribution and QoS demands (e.g. a guaranteed bit rate (GBR)) of devices. (It should be noted that the phrase "guaranteed bit rate of devices" or "communication requirements" are meant to encompass a quality of service (e.g., a guaranteed bit rate) of an application running on those devices. Each device may have multiple applications/series running, each with its own GBR). Due to physical limitations, such as roads for a mobile base station mounted on a car (Cell on Wheels—CoW), data size, the base station can may be placed at a sub-optimal point that is nearest in the optimality criterion to the optimal point.

For every physical location distribution of devices (sometimes called Subscriber Units (SUs)) with their communication requirements (e.g., voice call at a given SNR, GBR, etc.), there is at least one optimal physical location for a base station, denoted a Matching Optimal Location (MOL) and one or more Feasible Nearest Matching Optimal Location (FNMOL). The base station receives the device locations and the devices requirements and moves to a FNMOL. It should be noted that although the base station may receive the information to determine its new location, in an alternate embodiment an outside entity, such as a "cloud application" is much better practice to receive this info from the devices. The cloud application (referred to as a location server) may have more system wide data, such as a multi-agency and multi-base station data. After calculating/determining the new optimal location, the location server will send the new location to the serving base station(s) or to the nomadic platform that they are mounted on (car, drone . . . ), and the base station (or the nomadic platform) will displace itself to the new nearest optimal location, accordingly. As the device locations and requirements distribution changes, the base station adapts it own location to a nearest optimal point so it is always ready to serve the device distribution in a near optimal point.

Finding the optimal base station location for a given device distribution is an optimal search problem. The optimal point can be found by heuristic algorithms or numerical search of likely positions. Care must be given also to avoiding sub-optimal locally optimal points which are far worse than the optimal solution. As an example in FIG. 1: For the center-of-mass approach, the optimal base station location is the "center of gravity" of the device location distribution. In FIG. 1, it is assumed that every device has a same mass (m). However, this need not be the case. For example, an important service may be running on a particular device. The device may be weighted, having a mass M>>m.

By varying the mass of each subscriber unit, the method of dynamically determining an optimal location of the serving cell, gives the agency the ability to distinguish between the running applications that are consuming the system resources. According to a certain parameters (with respect to the agencies policy) a specific application or application running on a SU can be much more important than other ongoing applications, and the algorithm will give the particular SU more weigh to determine the optimal location (so that the BS new location will tend to these application geography). The optimal location of the serving cell can be determined as to follow after the location of a SU running a specific ongoing application, because of its importance of this application.

Thus, by varying the mass of each subscriber unit (and alternatively, each application running for each subscriber unit, The optimal (dynamic) position of the nomadic eNB (radio, police car, Drone) is determined by taking into account the distribution of the positions of the radios and the priority (mass) of their ongoing services (applications) which are dictated by the customers needs. The formula that may rank each running application in the system according to its priority (mass), can be thought of as:

Mass=f(Application Type, QoS, Data to transmit, User Type, Event Type, Time, Position . . . ), and the center of masses in the x, y, and z planes are $$x_{cm} = \frac{\sum_{i=1}^{N} m_i x_i}{M} \quad y_{cm} = \frac{\sum_{i=1}^{N} m_i y_i}{M} \quad z_{cm} = \frac{\sum_{i=1}^{N} m_i z_i}{M}.$$

The optimal base position for the current distribution of user locations and their cellular applications is the virtual center of gravity/mass of all the current cellular applications masses. The weight/mass of each cellular application can be a function of many factors, such as the type of data application (voice, video, sensor data, etc.), urgency (emergency sensor data, public safety calls, etc.), the amount of data to be transmitted, the Quality of Service (QoS) required, the user type (civil, public safety officer type and priority, etc.), the user affiliation with a specific Public safety agency and its prior agreements with other public safety agencies, specific time or position of users. In addition, if the system manager in the cloud wants to closely track a specific user or application, it can do so manually by giving that user and application a very large mass.

Figure 2:
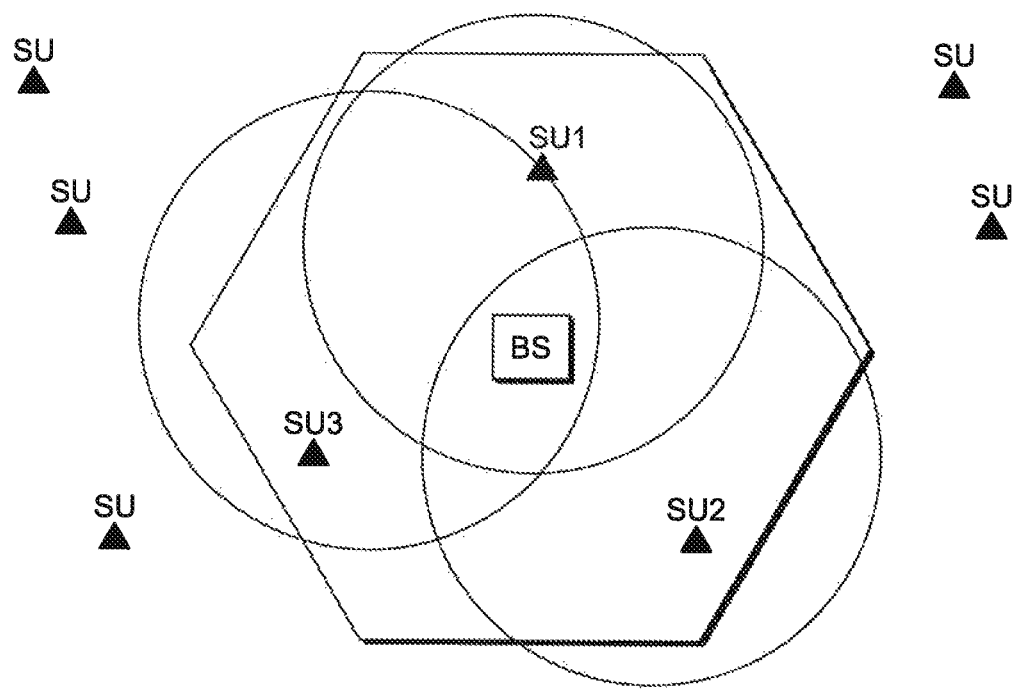
FIG. 2 illustrates a calculation of a center of mass.

In another embodiment of the present invention, movement of base stations may be based on an uplink-reception area as defined below. As the device locations distribution and communication requirements change, the base station adapts it own location (even when not all registered devices are active) to the nearest feasible optimal point so it is always ready to serve the device distribution in a near optimal point. The area where a base station location answers all device requirements is calculated as shown in FIG. 2. When a device location or device communication requirement changes, the allowed area is re-calculated and if needed some device requirements are relaxed. More particularly, in the quality-of-service approach to locating a base station, a relaxation in QoS is made for some devices, since the guaranteed bit rate (GBR) is granted. The relaxation is accomplished by changing a modulation scheme of a specific application due to a lower priority of this application relative to others with respect to the agencies policy.

Each service running in a device (SU) has certain requirements on its Quality of Service (QoS), Guaranteed Bit Rate (GBR), etc. These requirements define an area around the device where these QoS requirements can be met. In ideal Line of Sight (LOS) conditions this area would be a circle with the device at the center. With non LOS geographical constraints, the area would take other shapes (usually circle like convex shapes). This is denoted as the device Uplink Reception Area (device-URA). The uplink range is considered because it is always shorter than the downlink range, although in alternate embodiments of the present invention, a downlink range may also be considered.

A common intersection area of the device Uplink Reception Areas (device-URA) of all participating devices is the area where the Base Station (base station) can be placed to meet all QoS constraints of the participating devices. See FIG. 2 for illustration. If there is no common intersection area, the device-URA for one or more of the services of the devices can be relaxed according to a pre-determined Services Priority Policy (SPP) to enlarge some of the device-URA so the common intersection area is non-zero. Another option is to split up the group of devices into several groups that have a feasible non-zero intersection area inside the group and move several base stations to cover the two groups. The Services Priority Policy (SPP) assigns a priority grade to all services running on devices according to their parameters such as: Modulation, QoS, Data Size, Number Of Uplink RBs, Required SNR, or Geo-fencing. If the device-URA of a service on a device needs to be expanded, the parameters of its services are relaxed in the order of their priorities.

In some cases a rank of the services will determine the new location of the base station. In other cases, the grade of the services will determine the new location of the base station.

Figure 3:
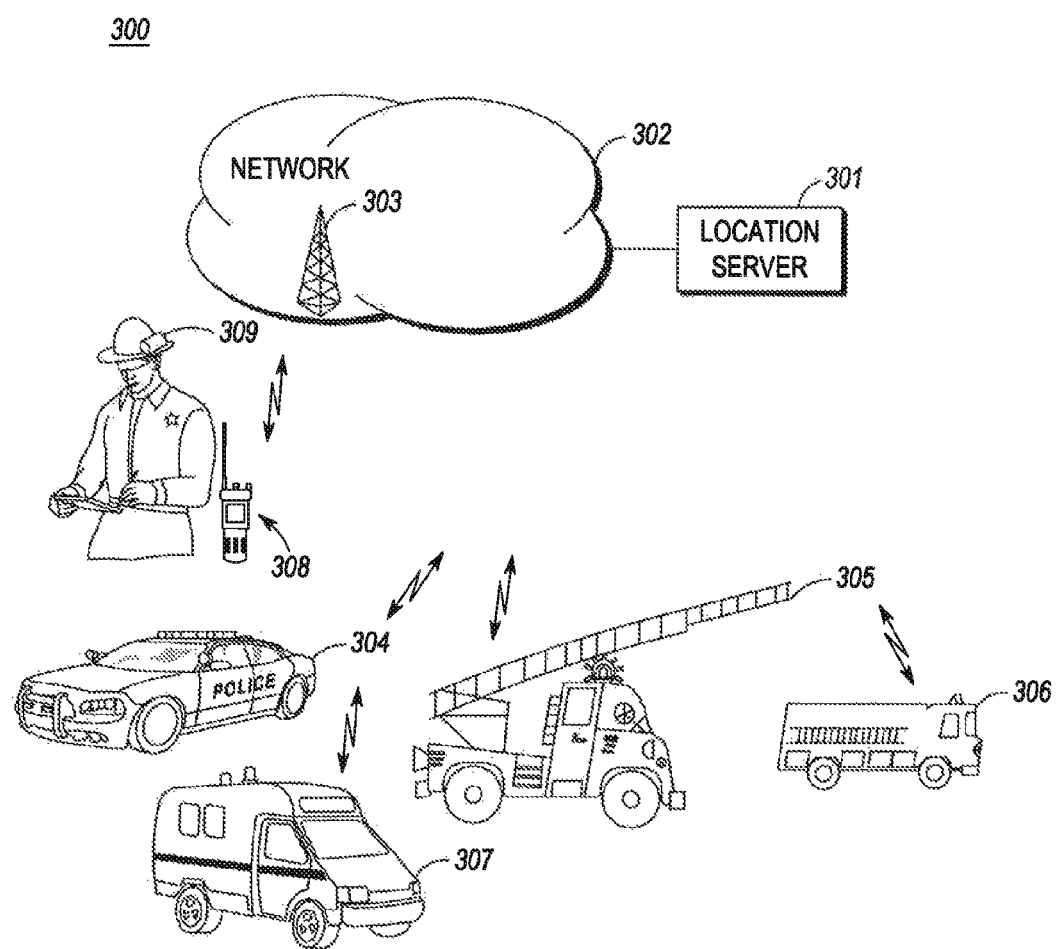
FIG. 3 is a block diagram showing a general operational environment of communication system.

FIG. 3 is a block diagram showing a general operational environment of communication system 300, according to one embodiment of the present invention. As shown in FIG. 3 a plurality of public-safety devices 304-308 are in communication with location server 301 through base station 303 and intervening network 302.

Public-safety devices 304-308 may comprise such devices as rescue devices, ladder trucks, ambulances, police cars, fire engines, a standalone display or monitor, a handheld computer, a tablet computer, a mobile phone, a police radio, a media player, a personal digital assistant (PDA), a GPS receiver, or the like, including a combination of two or more of these items.

Network 302 may comprise one of any number of overthe-air or wired networks. For example network 302 may comprise a private 802.11 network set up by a building operator, a next-generation cellular communications network operated by a cellular service provider, or any publicsafety network such as an APCO 25 network. Network 302 usually comprises several base stations and/or repeater stations 303 (only one shown). Base stations 303 can receive information (either control or media, e.g., data, voice (audio), video, etc.) in a signal from devices 304-308 and devices 308. Base stations 303 can also transmit information in signals to one or more devices 304-308 and devices 308. Base stations 303 have a finite capacity, that when reached, limit the base station from providing coverage to publicsafety devices.

Although only four public-safety devices 304-308 are shown, one of ordinary skill in the art will recognize that any number of devices may be geographically routed to a particular incident. Similarly, although only one device 308 is shown in FIG. 3, one of ordinary skill in the art will recognize that many more devices may be routed to any particular incident scene.

As discussed above, oftentimes a public-safety incident will over tax network equipment. For example, due to a large number of public-safety devices and personnel moved to, for example, a large fire, base station 303 handling the wireless communications at the scene, or to devices to/from the fire may be overloaded. (It should be noted that although the term "base station" is used herein, any overburdened network equipment may be overloaded, and aided in a similar manner as described below). In order to address this issue, base stations currently in use (referred to herein as portable base stations) will be moved when needed. This is illustrated in FIG. 4.

Figure 4:
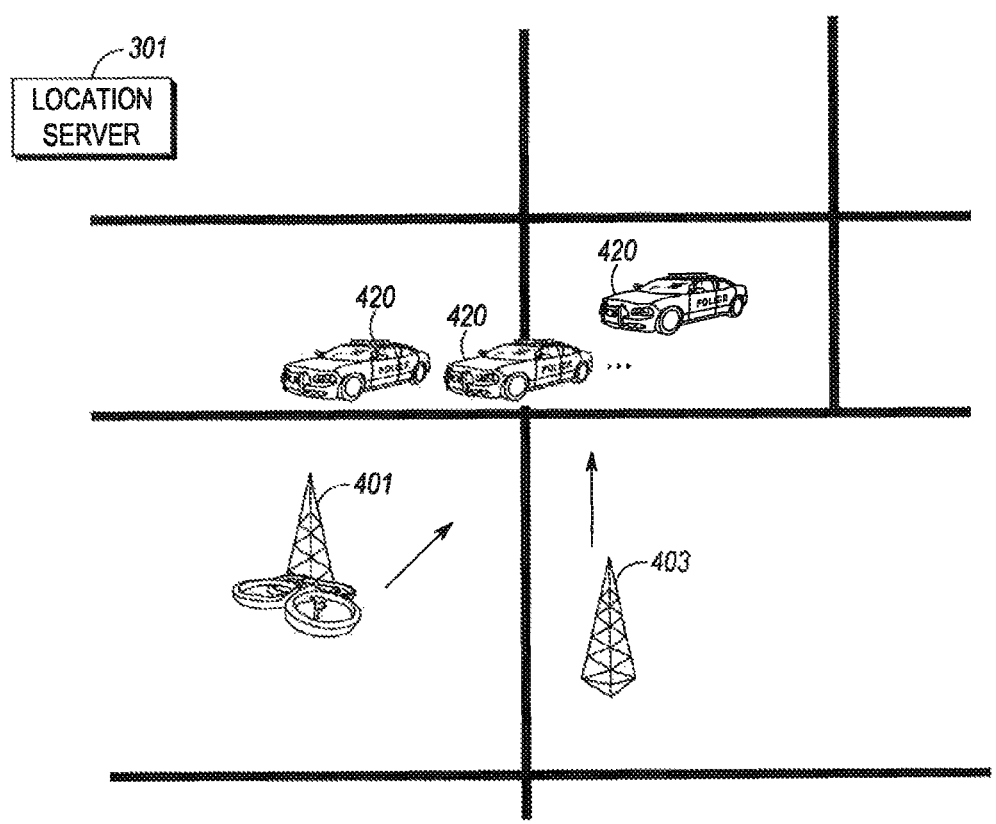
FIG. 4 illustrates the movement of network equipment.

With reference to FIG. 4, assume that base stations 401 and 403 are currently serving devices 420, with inadequate QoS being provided to at least some devices 420. Location server 301 may determine that base stations 401 and 403 do not have the capability to handle the traffic while satisfying a QoS requirement for devices 420, and will move at least one currently-functioning (i.e., currently in use serving remote units) portable base station in order to provide the QoS required by devices 420. This is illustrated in FIG. 4, with both base stations 401 and 403 being moved accordingly in the directions of the arrows.

It should be noted that the routing of base stations 401 and 403 will preferably take place by location server 301 providing the geographic coordinates to base stations 401 and 403 via over-the-air communication using network 302. Devices 420 may be "unaware" of any QoS load issues with any base station. As described above, the location of a particular base station may be determined as a center of mass for a plurality of subscriber units (each SU having a different mass that is proportional to its priority), or the location of a particular base station may be determined as a common intersection area of the device Uplink Reception Areas. As described, the URA of a particular device is an area surrounding an SU where a base station can be located and still satisfy a QoS requirement for a particular SU.

Figure 5:
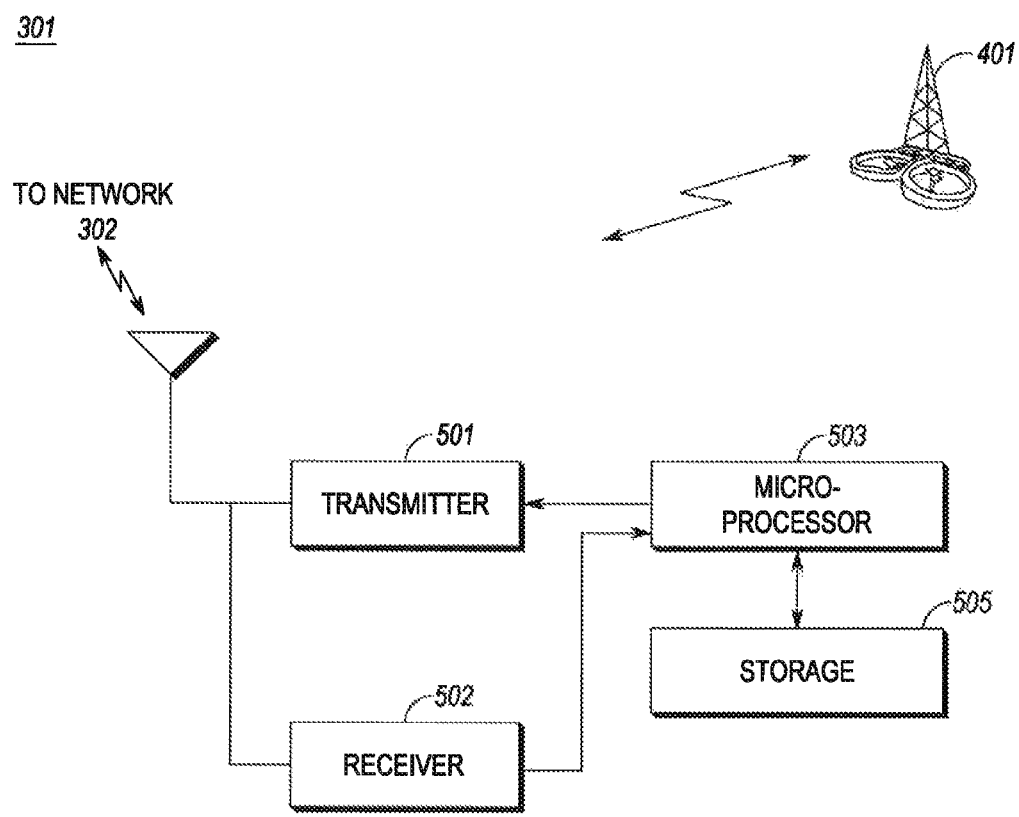
FIG. 5 is a block diagram of a location server.

FIG. 5 is a block diagram of location server 301. Location server 301 typically comprises processor 503 (sometimes referred to as a microprocessor, logic unit, or logic circuitry) that is communicatively coupled with various system components, including transmitter 501, receiver 502, and general storage component (database) 505. Only a limited number of system elements are shown for ease of illustration; but additional such elements may be included in the location server 301.

Processing device 503 may be partially implemented in hardware and, thereby, programmed with software or firmware logic or code for performing functionality described herein; and/or the processing device 503 may be completely implemented in hardware, for example, as a state machine or ASIC (application specific integrated circuit). Storage 505 can include short-term and/or long-term storage of various information needed for the recall of specific knowledge to aide in routing portable network equipment. For example, storage 505 may comprise street maps, coverage maps, vehicle locations, current locations of incidents, base station loading levels, routes for various devices, etc. Storage 505 may further store software or firmware for programming the processing device 503 with the logic or code needed to perform its functionality.

Transmitter 501 and receiver 502 are common circuitry known in the art for communication utilizing a well known communication protocol, and serve as means for transmitting and receiving messages. For example, receiver 502 and transmitter 501 may be well known long-range transceivers that utilize the Apco 25 (Project 25) communication system protocol. Other possible transmitters and receivers include, IEEE 802.11 communication system protocol, transceivers utilizing Bluetooth, HyperLAN protocols, or any other communication system protocol.

Using a center-of-mass approach to locating a base station, processor 503 is configured to receive a mass of each subscriber unit and a location of each subscriber unit, and output a location for base station 401 that is substantially the center of mass of each subscriber unit. In one particular embodiment, each application/service running on a subscriber unit may have its own mass, so that each subscriber units may have multiple masses. Processor 503 is configured to receive a location of all subscriber units, and calculate a center of mass for all applications/services running on all subscriber units. The location is output to base station 401.

Using a quality-of-service approach to locating base station 401, processor 503 receives a location of all devices (SUs) and calculates a URA for all applications running on those devices. An intersection of all URAs is output as a location to base station 401.

Figure 6:
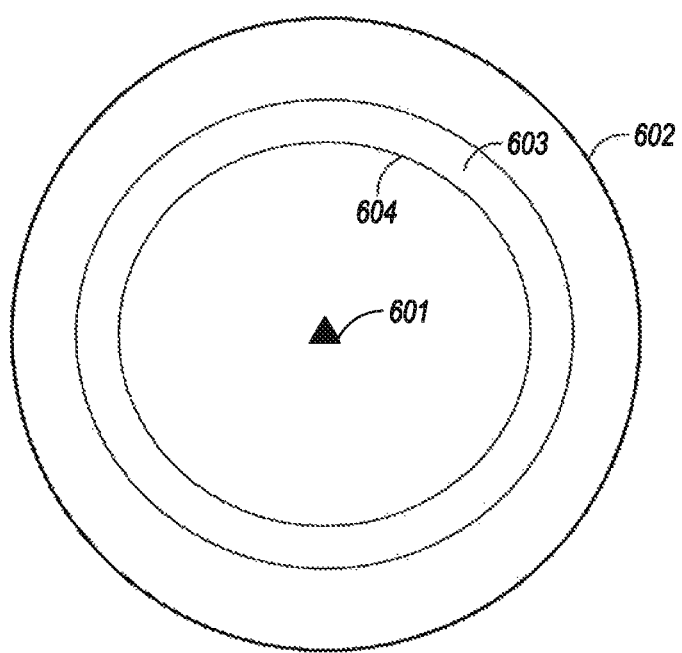
FIG. 6 illustrates a device uplink reception area.

Expanding on the quality-of-service approach to locating base station 401, each active data communication to a base station has certain requirements on its Quality of Service (QoS). For example, a certain device may be running three applications, the three applications may have three different QoS levels. A first application may be guaranteed 10 MB/s, while a second application running on the device may be guaranteed 5 MB/s, and a third application running on the device may only require 0.5 MB/s. These requirements define an area around the device where these QoS requirements can be met for a given Modulation Coding Scheme (MCS) by the base station. This area is denoted as the device Uplink Reception Area (device-URA). In ideal Line of Sight (LOS) conditions this area would be a circle with the SU at the center. This is illustrated in FIG. 6, with a first device (UE) 601 having three concentric circles, or URAs (one for each running application), each a distance away from device 601 that is based on a limit where the required QoS may be met by the base station. In other words, the QoS may be met by a base station if the base station lies within the URA. Thus, device 601, running three applications, will have three URAs 602-604.

In calculating an optimal base station position using the quality-of-service approach, logic circuitry 503 calculates a URA for an application with a highest modulation and coding scheme (MCS), and continues this calculation for all applications running on all devices. A common intersection area of all URAs is then calculated. This intersection is the optimal area where the Base Station (BS) can be located to meet all constraints of the participating devices.

If there is no common intersection area, a priority of all applications is determined by logic circuitry 503. This may be retrieved from storage 505. A URA for one (or more) of the lowest priority device services (applications) must be enlarged to create a non-zero intersection area by downgrading its MCS to a lower rate (e.g., from 64QAM to 16QAM to QPSK). This step is repeated for the next lowest priority device service until a common intersection area is non-zero.

Once an intersection in URAs is determined, at least one base station is instructed to move accordingly.

Figure 7:
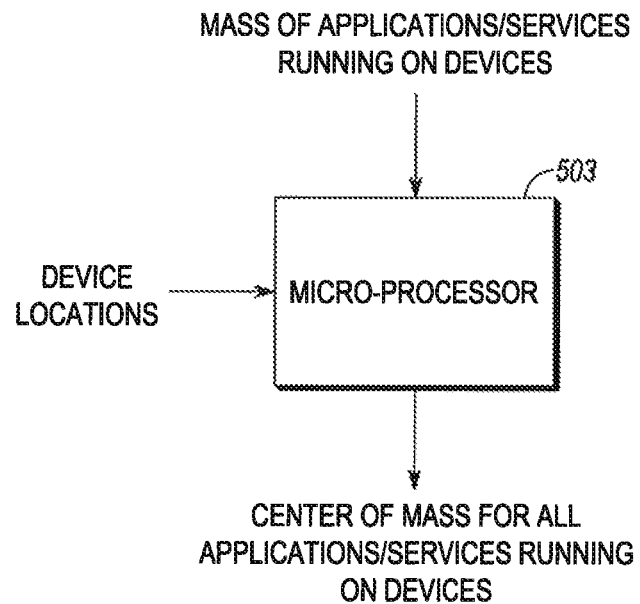
FIG. 7 illustrates the generation of the center of mass for all application/services running on devices.

FIG. 7 illustrates the generation of the center of mass for all application/services running on devices. As shown, logic circuitry 503 has device locations as an input. These device locations are preferably obtained from the devices themselves via an over-the-air transmission to receiver 502. Receiver 502 provides the locations to logic circuitry 503. A mass for each device (or a mass for each application/service running on each device) is also input to logic circuitry 503. This may be retrieved from storage 505 (stored as a device/mass pair or a application/mass pair), or may be input to logic circuitry 505 through a user interface. Logic circuitry 503 outputs a location of a center of mass for all applications/services running on all devices. The location is preferably output to transmitter 501 and transmitted to base station 401.

Thus, FIG. 7 illustrates a receiver outputting device locations, logic circuitry coupled to the receiver, the logic circuitry having the device locations as an input, the logic circuitry having a mass of applications running on the devices as an input, and the logic circuitry outputting a location of a center of mass for the applications running on the devices. A transmitter having the location of the center of mass as an input will output the location of the center of mass to network equipment, causing the network equipment to move its location to the location of the center of mass.

Figure 8:
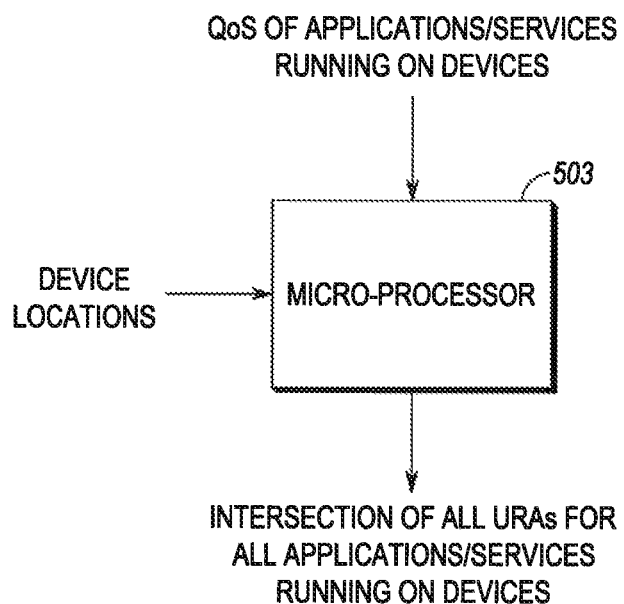
FIG. 8 illustrates the generation of an intersection of all URAs for all applications/services running on devices.

FIG. 8 illustrates the generation of an intersection of all URAs for all applications/services running on devices. As shown, logic circuitry 503 has device locations as an input. These device locations are preferably obtained from the devices themselves via an over-the-air transmission to receiver 502. Receiver 502 provides the locations to logic circuitry 503. A QoS for each device (or a QoS for each application/service running on each device) is also input to logic circuitry 503. This may be retrieved from storage 505 (stored as a device/mass pair or a application/mass pair), or may be input to logic circuitry 505 through a user interface. Logic circuitry 503 outputs a location of an intersection for all URAs for all applications/services running on all devices. The location is preferably output to transmitter 501 and transmitted to base station 401.

Thus, FIG. 8 illustrates a logic circuitry coupled to a receiver, the logic circuitry having the device locations as an input, the logic circuitry having a QoS of applications running on devices as an input, the logic circuitry calculating an uplink-reception area (URA) for the applications running on the of devices, and the logic circuitry outputting a location of an intersection of all URAs. A transmitter will have the location of the intersection as an input and output the location of the intersection to network equipment, causing the network equipment to move its location to near the location of the intersection of all URAs.

As discussed, the URA comprises an area surrounding a particular device where network equipment can be located to satisfy a quality of service for an application running on the particular device.

Figure 9:
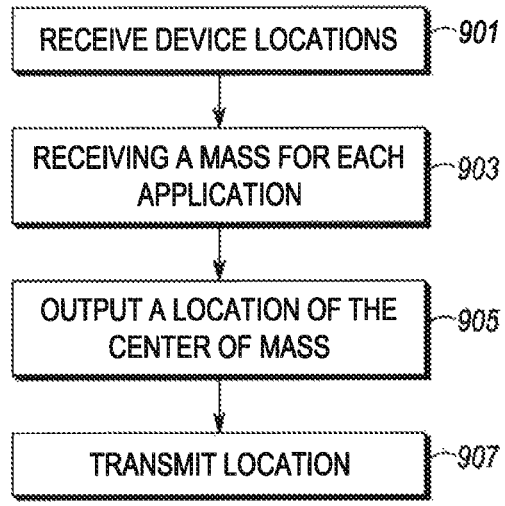
FIG. 9 is a flow chart showing operation of the location server of FIG. 5.

FIG. 9 is a flow chart showing operation of the location server of FIG. 5 using a center-of-gravity approach to locating a base station. At step 901 device locations are received by receiver 502 and input to logic circuitry 503. These device locations are preferably obtained from the devices themselves via an over-the-air transmission to receiver 502. Receiver 502 provides the locations to logic circuitry 503. At step 903, a mass for each device (or a mass for each application/service running on each device) is also input to logic circuitry 503. This may be retrieved from storage 505 (stored as a device/mass pair or an application/mass pair), or may be input to logic circuitry 505 through a user interface. At step 905, logic circuitry 503 calculates and outputs a location of a center of mass for all applications/services running on all devices. The location is preferably output to transmitter 501 and transmitted to base station 401 (step 907).

The above flow chart provides for a method for moving network equipment. The method comprises the steps of receiving locations for a plurality of devices, receiving a mass value for applications running on the plurality of devices, calculating a location of a center of mass for the applications running on the plurality of devices, and transmitting the location of the center of mass to network equipment, causing the network equipment to move its location to near the location of the center of mass.

As discussed, the step of receiving the locations comprises the step of receiving the locations from the devices via an over-the-air transmission from the devices while the step of receiving the mass value for applications comprises the step of accessing storage to retrieve the mass value for each application. The step of transmitting the location comprises the step of transmitting the location over-the-air to the network equipment, and the network equipment comprises a base station or repeater.

Figure 10:
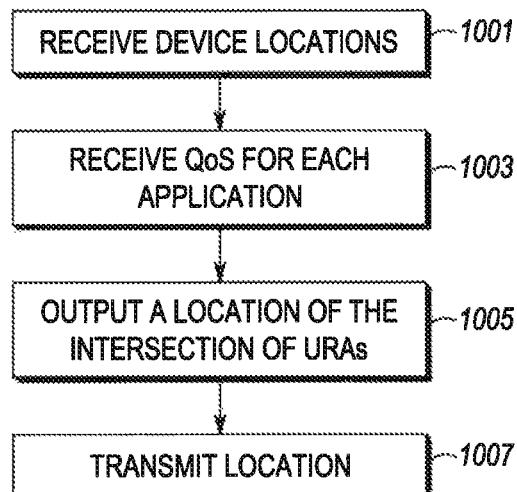
FIG. 10 is a flow chart showing operation of the location server of FIG. 5.

FIG. 10 is a flow chart showing operation of the location server of FIG. 5 using a quality-of-service approach to locating network equipment. At step 1001 device locations are received by receiver 502 and input to logic circuitry 503. These device locations are preferably obtained from the devices themselves via an over-the-air transmission to receiver 502. Receiver 502 provides the locations to logic circuitry 503. At step 1003, a Qos for each device (or a QoS for each application/service running on each device) is also input to logic circuitry 503. This may be retrieved from storage 505 (stored as a device/QoS pair or an application/QoS pair), or may be input to logic circuitry 505 through a user interface. At step 1005, logic circuitry 503 calculates and URAs for all applications/services, and outputs a location of an intersection of all URAs. The location is preferably output to transmitter 501 and transmitted to base station 401 (step 1007).

The above flow chart provides for a method for moving network equipment, the method comprises the steps of receiving locations for a plurality of devices, receiving a QoS value for applications running on the plurality of devices, calculating an uplink-reception area (URA) for the applications running on the plurality of devices, calculating a location of an intersection of all URAs, and transmitting the location of the intersection of all URAs to network equipment, causing the network equipment to move its location to near the location of the intersection of all URAs.

As discussed above, the URA comprises an area surrounding a particular device where network equipment can be located to satisfy a quality of service for an application running on the particular device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for moving a network equipment, the method comprising the steps of:
    receiving locations for a plurality of devices;
    receiving guaranteed bit rates for applications running on the plurality of devices;
    determining a plurality of areas by calculating for each device within the plurality of devices, an area surrounding each device where network equipment satisfies the guaranteed bit rate for the application(s) running on each device;
    calculating an intersection of the plurality of areas, the plurality of areas comprising at least a first area surrounding a first device, and a second area surrounding a second device; and
    transmitting the location of the intersection to the network equipment.

2. The method of claim 1 wherein the step of receiving the locations comprises the step of receiving the locations from the devices via an over-the-air transmission from the devices.

3. The method of claim 2 wherein the step of receiving the guaranteed bit rate value for each application comprises the step of accessing storage to retrieve the guaranteed bit rate value for each application.

4. The method of claim 3 wherein the step of transmitting the location comprises the step of transmitting the location over-the-air to the network equipment.

5. The method of claim 4 wherein the network equipment comprises a base station or repeater.

6. The method of claim 1 further comprising the step of: moving the base station to the location of the intersection.

7. An system comprising:
    a receiver receiving device locations;
    logic circuitry coupled to the receiver, the logic circuitry having the device locations as an input, the logic circuitry having a guaranteed bit rate of applications running on devices as an input, the logic circuitry determining a plurality of areas by calculating for each device within the plurality of devices, an area surrounding each device where network equipment satisfies the guaranteed bit rate for the application(s) running on each device, and the logic circuitry calculating an intersection of the plurality of areas, the plurality of areas comprising at least a first area surrounding a first device, and a second area surrounding a second device; and
    a transmitter having the location of the intersection as an input and outputting the location of the intersection to network equipment, causing the network equipment to move to near the location of the intersection of the plurality of areas.

8. The system of claim 7 wherein the receiver receives the device locations from the devices via an over-the-air transmission from the devices.

9. The system of claim 8 further comprises storage outputting the guaranteed bit rate of applications running on the devices to the logic circuitry.

10. The system of claim 9 wherein the transmitter comprises an over-the-air transmitter.

11. The system of claim 10 wherein the network equipment comprises a base station or repeater.

12. The system of claim 7 further comprising:
    a cell on wheels (COW), a snowmobile, a drone, an aircraft, or a balloon moving the network equipment to the location of the intersection.

* * * * *